US007969882B2

(12) United States Patent
Matsunaga

(10) Patent No.: US 7,969,882 B2
(45) Date of Patent: Jun. 28, 2011

(54) PACKET TRANSFER RATE MONITORING CONTROL APPARATUS, METHOD, AND PROGRAM

(75) Inventor: Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 2280 days.

(21) Appl. No.: 10/467,567

(22) PCT Filed: Feb. 6, 2002

(86) PCT No.: PCT/JP02/00951
§ 371 (c)(1),
(2), (4) Date: Aug. 8, 2003

(87) PCT Pub. No.: WO02/065711
PCT Pub. Date: Aug. 22, 2002

(65) Prior Publication Data
US 2004/0066746 A1    Apr. 8, 2004

(30) Foreign Application Priority Data
Feb. 9, 2001    (JP) .................................. 2001-033314

(51) Int. Cl.
*H04L 12/26* (2006.01)
(52) U.S. Cl. ...... 370/235; 370/229; 370/230; 370/230.1; 370/231; 370/232; 370/233; 370/234
(58) Field of Classification Search ........... 370/229–235
See application file for complete search history.

(56) References Cited

U.S. PATENT DOCUMENTS

| 5,311,513 | A |   | 5/1994  | Ahmadi et al. |         |
|-----------|---|---|---------|---------------|---------|
| 6,064,651 | A |   | 5/2000  | Rogers et al. |         |
| 6,104,700 | A | * | 8/2000  | Haddock et al.| 370/235 |
| 6,310,857 | B1| * | 10/2001 | Duffield et al.| 370/232 |
| 6,466,543 | B1| * | 10/2002 | Aoki          | 370/230 |
| 6,724,721 | B1| * | 4/2004  | Cheriton      | 370/229 |
| 6,996,062 | B1| * | 2/2006  | Freed et al.  | 370/235 |

(Continued)

FOREIGN PATENT DOCUMENTS
JP    09-046344    2/1997
(Continued)

OTHER PUBLICATIONS

K. Ramakrishnan et al., A Proposal to add Explicit Congestion Notification (ECN) to IP, Jan. 1999, Network Working Group, Request for Comments: 2481, pp. 1-24.*

Touma, et al., "Traffic Characteristics of IP for ATM Router With Priority IP Packet Multiplex", Technical Report of IEICE, IN99-10, CS99-10, MVE99-10, Apr. 1999, with partial translation.

(Continued)

*Primary Examiner* — William Trost, IV
*Assistant Examiner* — Toan D Nguyen
(74) *Attorney, Agent, or Firm* — McGinn IP Law Group, PLLC

(57) ABSTRACT

In a packet communication network in which the minimum guaranteed rate and maximum limiting rate of packet transfer are contracted for each service, this invention classifies flows corresponding to received packets into group 1 to which a flow whose packet transfer rate is less than the minimum guaranteed rate belongs, group 2 to which a flow whose packet transfer rate is equal to or higher than the minimum guaranteed rate and less than the maximum limiting rate belongs, and group 3 to which a flow whose packet transfer rate exceeds the maximum limiting rate belongs.

16 Claims, 5 Drawing Sheets

U.S. PATENT DOCUMENTS

| | | | |
|---|---|---|---|
| 7,006,440 B2 * | 2/2006 | Agrawal et al. | 370/235 |
| 7,020,143 B2 * | 3/2006 | Zdan | 370/395.21 |
| 7,088,716 B2 * | 8/2006 | Sugai et al. | 370/392 |
| 2003/0007452 A1 * | 1/2003 | Gorti et al. | 370/229 |

FOREIGN PATENT DOCUMENTS

| | | |
|---|---|---|
| JP | 09-149046 | 6/1997 |
| JP | 11-88343 | 3/1999 |
| JP | 2000-78158 | 3/2000 |

OTHER PUBLICATIONS

Suda, et al., "Evaluation of Excess Bandwidth Allocation Scheme on the IP Flow Control Engine", The collected lecture papers of the 2001 Institute of Electronics, Information and Communication Engineers Comprehensive Convention, Issued Mar. 7, 2001, with English Abstract.

Translation of International Preliminary Examination Report dated Feb. 6, 2002, PCT/IPEA/409.

* cited by examiner

DATA STRUCTURE OF MINIMUM GUARANTEED RATE STORAGE MEANS 305

| FLOW IDENTIFIER (500) | MINIMUM GUARANTEED TATE (510) |
|---|---|
| ⋮ | ⋮ |
| Fx | 256 kb/s |
| ⋮ | ⋮ |

DATA STRUCTURE OF MAXIMUM LIMITING RATE STORAGE MEANS 306

| FLOW IDENTIFIER (501) | MAXIMUM LIMITING RATE (520) |
|---|---|
| ⋮ | ⋮ |
| Fx | 1.5 Mb/s |
| ⋮ | ⋮ |

DATA STRUCTURE OF PACKET TRANSFER RATE MEASURING MEANS 304

| FLOW IDENTIFIER (502) | PACKET TRANSFER RATE (530) | QUEUE GROUP (531) | LAST TRANSFER TIME (532) | NUMBER OF PACKETS BEING QUEUED (533) |
|---|---|---|---|---|
| ⋮ | ⋮ | ⋮ | ⋮ | ⋮ |
| Fx | 720 kb/s | 2 | 00030508 | 00030501 |
| ⋮ | ⋮ | ⋮ | ⋮ | ⋮ |

FLOW IDENTIFICATION DATABASE 303

| FLOW IDENTIFIER (503) | TRANSMISSION SOURCE IP ADDRESS (540) | DESTINATION IP ADDRESS (541) | TRANSPORT LAYER PROTOCOL (542) | TRANSMISSION SOURCE PORT NUMBER (543) | DESTINATION PORT NUMBER (544) |
|---|---|---|---|---|---|
| ⋮ | ⋮ | ⋮ | ⋮ | ⋮ | ⋮ |
| Fx | 1.2.3.4 | 5.6.7.8 | UDP | 10000 | 20000 |
| ⋮ | ⋮ | ⋮ | ⋮ | ⋮ | ⋮ |

FIG. 3

PACKET TRANSFER RATE MONITORING CONTROL APPARATUS, METHOD, AND PROGRAM

TECHNICAL FIELD

The present invention relates to a packet transfer rate monitoring control apparatus, method, and program to be incorporated into a packet transfer apparatus, in a packet communication network in which the minimum guaranteed rate or maximum limiting rate of packet transfer is contracted for each subscriber or service.

BACKGROUND ART

In packet communication using a high-speed access network such as two-way CATV or ADSL (Asymmetric Digital Subscriber Loop), it is a general practice to contract one or both of the minimum guaranteed rate and maximum limiting rate of packet transfer between a subscriber and the carrier, and decide a connection fee in accordance with the contracted value.

Although one contract is made for each subscriber in some cases, a plurality of contracts are sometimes made in accordance with services such as data, audio, and video services which a subscriber uses. Especially when a carrier applies different charging systems to different services, the minimum guaranteed rate and maximum limiting rate of packet transfer are contracted for each service which a subscriber uses, as in the latter case.

Also, depending on the type of service, the allowance of burst, maximum transfer delay time, and the like are also contracted in addition to the minimum guaranteed rate and maximum limiting rate of packet transfer.

To fulfil the contents of these contracts with subscribers, therefore, a packet transfer apparatus of the carrier of a packet network requires a packet transfer rate monitoring control apparatus.

This packet transfer rate monitoring control apparatus identifies an upper layer flow from the header information of a packet to be transferred, and compares, for each flow, the packet transfer rate with the minimum guaranteed rate or maximum limiting rate contracted by a subscriber in advance. In accordance with the comparison result or a service to which the flow belongs, the apparatus performs traffic priority control, polishing, shaping, and the like.

As the conventional packet transfer rate monitoring control apparatus, a UPC (Usage Parameter Control) apparatus in an ATM (Asynchronous Transfer Mode) network is known. For example, those described in U.S. Pat. Nos. 5,311,513 and 6,064,651 and Japanese Patent Laid-Open Nos. 9-46344 and 9-149046 are known.

Unfortunately, these conventional packet transfer rate monitoring control apparatuses define a contracted value of the maximum limiting rate by several types of parameters, and, if this contracted value is violated, discard the packet or lower the priority of transfer by adding a tag indicating the contract violation to the packet header, so that the contracted value of the maximum limiting rate is not exceeded for all flows.

This system works if the maximum limiting rate and minimum guaranteed rate are equal. However, if these values are different and the total of the maximum limiting rates of individual flows is set to exceed the interface rate of the packet transfer apparatus, and if traffic increases temporarily, the minimum guaranteed rates of some flows are no longer ensured although each individual flow does not exceed the maximum limiting rate.

DISCLOSURE OF INVENTION

It is the first object of the present invention to provide a packet transfer rate monitoring control apparatus and the like which, in a packet communication network in which the minimum guaranteed rate and maximum limiting rate of packet transfer are contracted for each service which a subscriber uses, can ensure a packet transfer rate higher than the minimum guaranteed rate even when traffic has increased.

It is the second object of the present invention to provide a packet transfer rate monitoring control apparatus and the like which, in a packet communication network in which the minimum guaranteed rate and maximum limiting rate of packet transfer are contracted for each service which a subscriber uses, can always give priority to packet transfer of a flow lower than the minimum guaranteed rate by classifying upper layer flows to which received packets belong into three groups in accordance with the packet transfer rate, and can thereby assure the minimum guaranteed rates of all flows even when traffic has increased temporarily.

It is the third object of the present invention to provide a packet transfer rate monitoring control apparatus and the like which, in a packet communication network in which the minimum guaranteed rate and maximum limiting rate of packet transfer are contracted for each service which a subscriber uses, performs queuing of packets for each flow and can thereby easily perform shaping, such that the traffic characteristic follows the maximum limiting rate, in addition to packet discarding and tagging, for a packet which belongs to a flow exceeding the maximum limiting rate.

It is the fourth object of the present invention to provide a packet transfer rate monitoring control apparatus and the like which, in a packet communication network in which the minimum guaranteed rate and maximum limiting rate of packet transfer are contracted for each service which a subscriber uses, redistributes an extra band to flows which are transferring packets and can thereby fairly allocate the extra band to flows whose packet transfer rates are equal to or higher than the minimum guaranteed rate or lower than the maximum limiting rate, in accordance with the minimum guaranteed rate of each flow.

It is the fifth object of the present invention to provide a packet transfer rate monitoring control apparatus and the like which, in a packet communication network in which the minimum guaranteed rate and maximum limiting rate of packet transfer are contracted for each service which a subscriber uses, defines a weighting coefficient by using a parameter a which takes a value from 0 to 1 and thereby allows the carrier to redistribute an extra band on the basis of both the contracted value of the minimum guaranteed rate and the contracted value of the maximum limiting rate.

It is the sixth object of the present invention to provide a packet transfer rate monitoring control apparatus and the like which, in a packet communication network in which the minimum guaranteed rate and maximum limiting rate of packet transfer are contracted for each service which a subscriber uses, switches packet discarding and shaping in accordance with a transport layer protocol and can thereby not only accurately limit the maximum limiting rate but also save buffers for shaping.

It is the seventh object of the present invention to provide a packet transfer rate monitoring control apparatus and the like which, in a packet communication network in which the minimum guaranteed rate and maximum limiting rate of packet transfer are contracted for each service which a subscriber uses, can restrict the packet transfer rate to the maximum limiting rate without performing any packet discarding or shaping.

It is the eighth object of the present invention to provide a packet transfer rate monitoring control apparatus and the like which, in a packet communication network in which the minimum guaranteed rate and maximum limiting rate of packet transfer are contracted for each service which a subscriber uses, if the packet transfer rate becomes lower than the maximum limiting rate, can restrict the packet transfer rate to the maximum limiting rate by stopping overwriting of the receiving window size in an acknowledgement packet.

It is the eighth object of the present invention to provide a packet transfer rate monitoring control apparatus and the like which, in a packet communication network in which the minimum guaranteed rate and maximum limiting rate of packet transfer are contracted for each service which a subscriber uses, can ensure a packet transfer rate higher than the minimum guaranteed rate even when traffic has increased.

To achieve these objects, the first packet transfer rate monitoring control apparatus of the present invention is a packet transfer rate monitoring control apparatus of a packet transfer apparatus for routing a variable-length packet, characterized in that, from a received packet an upper layer flow to which the received packet belongs is identified, a packet transfer rate is measured from the transfer interval and length of the received packet, and the measured packet transfer rate is compared with rate information preset for each flow to determine priority order in which individual received packets are transferred, thereby preferentially transferring a packet received in relation to a flow whose packet transfer rate is less than a minimum guaranteed rate before a packet received in relation to a flow whose packet transfer rate is equal to or higher than the minimum guaranteed rate, and preferentially transferring a packet received in relation to a flow whose packet transfer rate is less than a maximum limiting rate before a packet received in relation to a flow whose packet transfer rate is equal to or higher than the maximum limiting rate.

A packet transfer rate monitoring control apparatus of the second invention is characterized by comprising, in the first invention, upper layer flow identifying means for identifying, from header information of a received packet, an upper layer flow to which the received packet belongs, packet transfer rate measuring means for measuring a packet transfer rate from the transfer interval and length of a received packet, for each flow identified by the upper layer flow identifying means, comparing means for comparing the packet transfer rate measured by the packet transfer rate measuring means with minimum guaranteed rate information and maximum limiting rate information preset for each flow, and classifying means for classifying flows corresponding to received packets, on the basis of the result of comparison by the comparing means, into group 1 to which a flow whose packet transfer rate is less than the minimum guaranteed rate belongs, group 2 to which a flow whose packet transfer rate is equal to or higher than the minimum guaranteed rate and less than the maximum limiting rate belongs, and group 3 to which a flow whose packet transfer rate exceeds the maximum limiting rate belongs, wherein a packet received in relation to a flow which belongs to group 1 is preferentially transferred before a packet received in relation to a flow which belongs to group 2, and a packet received in relation to a flow which belongs to group 2 is preferentially transferred before a packet received in relation to a flow which belongs to group 3.

A packet transfer rate monitoring control apparatus of the third invention is characterized in that, in the second invention, the received packets are queued in order of arrival for each flow identified by the upper layer flow identifying means.

A packet transfer rate monitoring control apparatus of the fourth invention is characterized in that, in the second or third invention, letting $\{K_1, K_2, \ldots, K_i\}$ be minimum guaranteed rates preset for flows $\{F_1, F_2, \ldots, F_i\}$ which belong to group 1 and Ksum be the sum total of these minimum guaranteed rates, weighting coefficients $\{W_1, W_2, \ldots, W_i\}$ for the flows $\{F_1, F_2, \ldots, F_i\}$ which belong to group 1 are defined as $W_1=K_1/Ksum, W_2=K_2/Ksum, \ldots, W_i=K_i/Ksum$, letting $\{L_1, L_2, \ldots, L_j\}$ be minimum guaranteed rates preset for flows $\{G_1, G_2, \ldots, G_j\}$ which belong to group 2 and Lsum be the sum total of these minimum guaranteed rates, weighting coefficients $\{V_1, V_2, \ldots, V_j\}$ for the flows $\{G_1, G_2, \ldots, G_j\}$ which belong to group 2 are defined as $V_1=L_1/Lsum, V_2=L_2/Lsum, \ldots, V_j=L_j/Lsum$, letting C be the output interface rate of a packet, the flows $\{F_1, F_2, \ldots, F_i\}$ of group 1 are classified into group 1A whose packet transfer rate is less than $\{C \times W_1, C \times W_2, \ldots, C \times W_i\}$ and group 1B whose packet transfer rate is equal to or higher than $\{C \times W_1, C \times W_2, \ldots, C \times W_i\}$, and the flows $\{G_1, G_2, \ldots, G_j\}$ of group 2 are classified into group 2A whose packet transfer rate is less than $\{(C-Ksum) \times V_1, (C-Ksum) \times V_2, \ldots, (C-Ksum) \times V_j\}$ and group 2B whose packet transfer rate is equal to or higher than $\{(C-Ksum) \times V_1, (C-Ksum) \times V_2, \ldots, (C-Ksum) \times V_j\}$, and a packet received in relation to a flow which belongs to group 1A is preferentially transferred before a packet received in relation to a flow which belongs to group 1B, and a packet received in relation to a flow which belongs to group 2A is preferentially transferred before a packet received in relation to a flow which belongs to group 2B.

A packet transfer rate monitoring control apparatus of the fifth invention is characterized in that, in the second or third invention, letting $\{M_1, M_2, \ldots, M_i\}$ be maximum limiting rates preset for flows $\{F_1, F_2, \ldots, F_i\}$ which belong to group 1 and Msum be the sum total of these maximum limiting rates, weighting coefficients $\{W_1, W_2, \ldots, W_i\}$ for the flows $\{F_1, F_2, \ldots, F_i\}$ which belong to group 1 are defined as $W_1=M_1/Msum, W_2=M_2/Msum, \ldots, W_i=M_i/Msum$, letting $\{N_1, N_2, \ldots, N_j\}$ be maximum limiting rates preset for flows $\{G_1, G_2, \ldots, G_j\}$ which belong to group 2 and Nsum be the sum total of these maximum limiting rates, weighting coefficients $\{V_1, V_2, \ldots, V_j\}$ for the flows $\{G_1, G_2, \ldots, G_j\}$ which belong to group 2 are defined as $V_1=N_1/Nsum, V_2=N_2/Nsum, \ldots, V_j=N_j/Nsum$, letting C be the output interface rate of a packet, the flows $\{F_1, F_2, \ldots, F_i\}$ of group 1 are classified into group 1A whose packet transfer rate is less than $\{C \times W_1, C \times W_2, \ldots, C \times W_i\}$ and group 1B whose packet transfer rate is equal to or higher than $\{C \times W_1, C \times W_2, \ldots, C \times W_i\}$, and the flows $\{G_1, G_2, \ldots, G_j\}$ of group 2 are classified into group 2A whose packet transfer rate is less than $\{(C-Msum) \times V_1, (C-Msum) \times V_2, \ldots, (C-Msum) \times V_j\}$ and group 2B whose packet transfer rate is equal to or higher than $\{(C-Msum) \times V_1, (C-Msum) \times V_2, \ldots, (C-Msum) \times V_j\}$, and a packet received in relation to a flow which belongs to group 1A is preferentially transferred before a packet received in relation to a flow which belongs to group 1B, and a packet received in relation to a flow which belongs to group 2A is preferentially transferred before a packet received in relation to a flow which belongs to group 2B.

A packet transfer rate monitoring control apparatus of the sixth invention is characterized in that, in the second or third invention, letting $\{K1, K2, \ldots, Ki\}$ be minimum guaranteed rates preset for flows $\{F1, F2, \ldots, Fi\}$ which belong to group 1 and Ksum be the sum total of these minimum guaranteed rates, weighting coefficients $\{W1, W2, \ldots, Wi\}$ for the flows $\{F1, F2, \ldots, Fi\}$ which belong to group 1 are defined as W1=K1/Ksum, W2=K2/Ksum, ..., Wi=Ki/Ksum, letting $\{L1, L2, \ldots, Lj\}$ be minimum guaranteed rates preset for flows $\{G1, G2, \ldots, Gj\}$ which belong to group 2 and Lsum be the sum total of these minimum guaranteed rates, weighting coefficients $\{V1, V2, \ldots, Vj\}$ for the flows $\{G1, G2, \ldots, Gj\}$ which belong to group 2 are defined as V1=L1/Lsum, V2=L2/Lsum, ..., Vj=Lj/Lsum, letting $\{M1, M2, \ldots, Mi\}$ be maximum limiting rates preset for the flows $\{F1, F2, \ldots, Fi\}$ which belong to group 1 and Msum be the sum total of these maximum limiting rates, weighting coefficients $\{W1, W2, \ldots, Wi\}$ for the flows $\{F1, F2, \ldots, Fi\}$ which belong to group 1 are defined as W1=M1/Msum, W2=M2/Msum, ..., Wi=Mi/Msum, letting $\{N1, N2, \ldots, Nj\}$ be maximum limiting rates preset for the flows $\{G1, G2, \ldots, Gj\}$ which belong to group 2 and Nsum be the sum total of these maximum limiting rates, weighting coefficients $\{V1, V2, \ldots, Vj\}$ for the flows $\{G1, G2, \ldots, Gj\}$ which belong to group 2 are defined as V1=N1/Nsum, V2=N2/Nsum, ..., Vj=Nj/Nsum, by using a parameter $\alpha$ which takes a value from 0 to 1, the weighting coefficients $\{W1, W2, \ldots, Wi\}$ for the flows $\{F1, F2, \ldots, Fi\}$ which belong to group 1 are defined by W1=$\alpha \times$K1/Ksum+$(1-\alpha) \times$M1/Msum, W2=$\alpha \times$K2/Ksum+$(1-\alpha) \times$M2/Msum, ..., Wi=$\alpha$=Ki/Ksum+$(1-\alpha) \times$Mi/Msum, and the weighting coefficients $\{V1, V2, \ldots, Vj\}$ for the flows $\{G1, G2, \ldots, Gj\}$ which belong to group 2 are defined by V1=$\alpha \times$L1/Lsum+$(1-\alpha) \times$N1/Nsum, V2=$\alpha \times$L2/Lsum+$(1-\alpha) \times$N2/Nsum, ..., Vj=$\alpha \times$Lj/Lsum+$(1-\alpha) \times$Nj/Nsum, and the parameter $\alpha$ can be externally set.

A packet transfer rate monitoring control apparatus of the seventh invention is characterized by further comprising, in the second or third invention, protocol type identifying means for identifying the protocol type of a transport layer from header information of a received packet, wherein if a packet transfer rate exceeds the maximum limiting rate, it is selected, in accordance with the transport layer's protocol identified by the protocol type identifying means, whether to discard the received packet or perform shaping by delaying transfer of the received packet until the packet transfer rate becomes equal to or lower than the maximum limiting rate.

A packet transfer rate monitoring control apparatus of the eighth invention is characterized by further comprising, in the second or third invention, protocol type identifying means for identifying the protocol type of a transport layer from header information of a received packet, wherein if the transport layer's protocol identified by the protocol type identifying means is TCP (Transmission Control Protocol) and a packet transfer rate exceeds the maximum limiting rate, a CE (Congestion Experienced) bit defined by RFC2481 is added to the header of the packet to be transferred, thereby informing a transmitting node of suppression of a transmission rate.

A packet transfer rate monitoring control apparatus of the ninth invention is characterized by further comprising, in the second or third invention, protocol type identifying means for identifying the protocol type of a transport layer from header information of a received packet, wherein if the transport layer's protocol identified by the protocol type identifying means is TCP (Transmission Control Protocol) and a packet transfer rate exceeds the maximum limiting rate, the receiving window size is overwritten to 0 in the TCP header of an acknowledgement packet transferred from a receiving node to the transmitting node after that, thereby informing a transmitting node of suppression of a transmission rate.

The 10th invention is packet transfer rate monitoring control method of a packet transfer apparatus for routing a variable-length packet, characterized in that, from a received packet an upper layer flow to which the received packet belongs is identified, a packet transfer rate is measured from the transfer interval and length of the received packet, and the measured packet transfer rate is compared with rate information preset for each flow to determine priority order in which individual received packets are transferred, thereby preferentially transferring a packet received in relation to a flow whose packet transfer rate is less than a minimum guaranteed rate before a packet received in relation to a flow whose packet transfer rate is equal to or higher than the minimum guaranteed rate, and preferentially transferring a packet received in relation to a flow whose packet transfer rate is less than a maximum limiting rate before a packet received in relation to a flow whose packet transfer rate is equal to or higher than the maximum limiting rate.

In this 10th invention, therefore, in a packet communication network in which the minimum guaranteed rate and maximum limiting rate of packet transfer are contracted for each service which a subscriber uses, a packet transfer rate equal to or higher than the minimum guaranteed rate can be assured even when traffic has increased.

A packet transfer rate monitoring control method of the 11th embodiment is characterized by comprising the upper layer flow identification procedure of identifying, from header information of a received packet, an upper layer flow to which the received packet belongs, the packet transfer rate measurement procedure of measuring a packet transfer rate from the transfer interval and length of a received packet, for each flow identified by the upper layer flow identification procedure, the comparison procedure of comparing the packet transfer rate measured by the packet transfer rate measurement procedure with minimum guaranteed rate information and maximum limiting rate information preset for each flow, the classification procedure of classifying flows corresponding to received packets, on the basis of the result of comparison by the comparison procedure, into group 1 to which a flow whose packet transfer rate is less than the minimum guaranteed rate belongs, group 2 to which a flow whose packet transfer rate is equal to or higher than the minimum guaranteed rate and less than the maximum limiting rate belongs, and group 3 to which a flow whose packet transfer rate exceeds the maximum limiting rate belongs, and the transfer control procedure of preferentially transferring a packet received in relation to a flow which belongs to group 1 before a packet received in relation to a flow which belongs to group 2, and preferentially transferring a packet received in relation to a flow which belongs to group 2 before a packet received in relation to a flow which belongs to group 3.

The 12th invention is a program for controlling the operation of a computer which controls a packet transfer apparatus for routing a variable-length packet, characterized by allowing the computer to execute the upper layer flow identification procedure of identifying, from header information of a received packet, an upper layer flow to which the received packet belongs, the packet transfer rate measurement procedure of measuring a packet transfer rate from the transfer interval and length of a received packet, for each flow identified by the upper layer flow identification procedure, the comparison procedure of comparing the packet transfer rate measured by the packet transfer rate measurement procedure with minimum guaranteed rate information and maximum limiting rate information preset for each flow, the classification procedure of classifying flows corresponding to received packets, on the basis of the result of comparison by the comparison procedure, into group 1 to which a flow whose packet transfer rate is less than the minimum guaranteed rate belongs, group 2 to which a flow whose packet transfer rate is equal to or higher than the minimum guaranteed rate and less than the maximum limiting rate belongs, and group 3 to which a flow whose packet transfer rate exceeds the maximum limiting rate belongs, and the transfer control procedure of preferentially transferring a packet received in relation to a flow which belongs to group 1 before a packet received in relation to a flow which belongs to group 2, and preferentially transferring a packet received in relation to a flow which belongs to group 2 before a packet received in relation to a flow which belongs to group 3.

BRIEF DESCRIPTION OF DRAWINGS

FIG. 3 is a view for explaining the data structures of a flow identification database, packet transfer rate measuring means, minimum guaranteed rate storage means, and maximum limiting rate storage means;

BEST MODE OF CARRYING OUT THE INVENTION

Embodiments of a packet transfer rate monitoring control apparatus, method, and program according to the present invention will be described below.

Note that these embodiments explained below are preferred practical examples of the present invention. Although various technically favored limitations are imposed on these embodiments, the scope of the present invention is not restricted to these embodiments unless otherwise specified.

Figure 1:
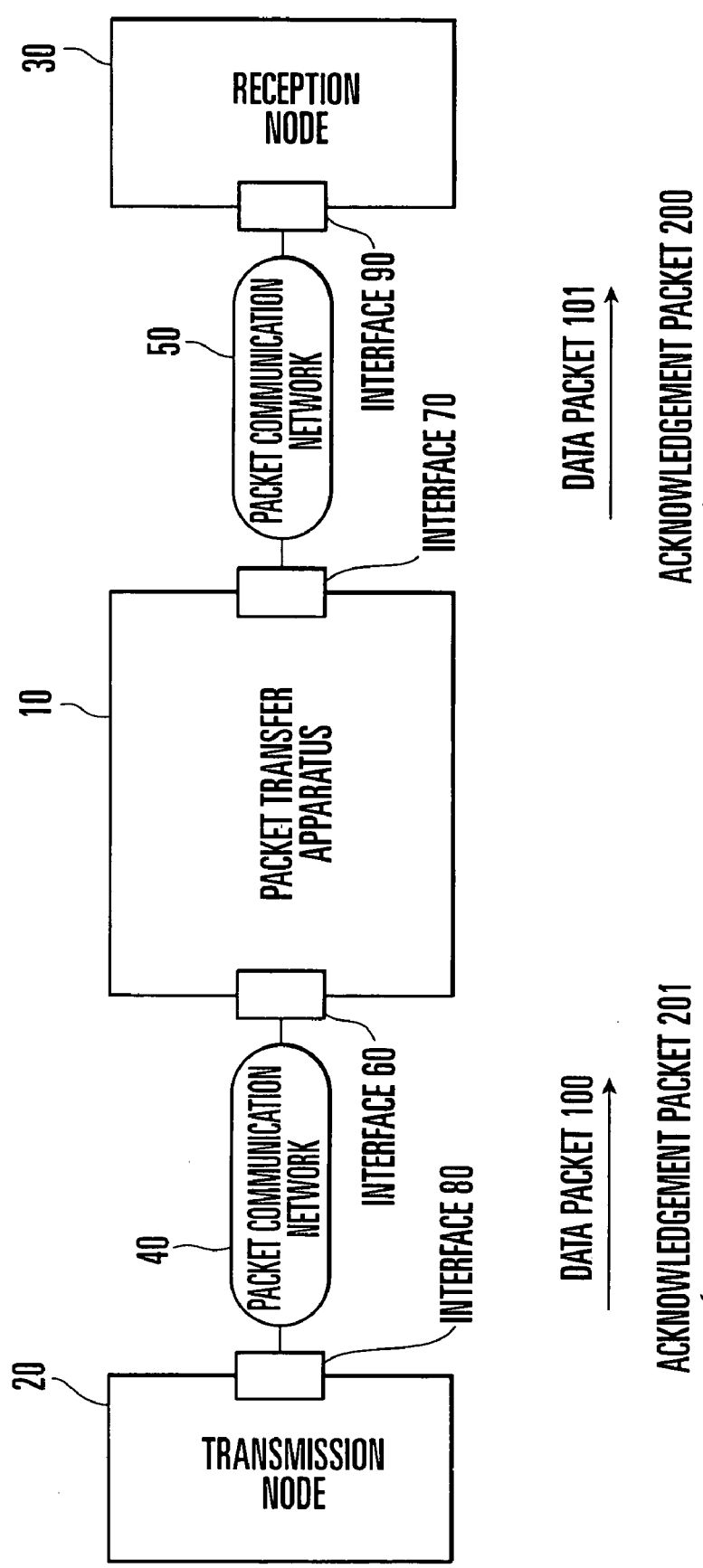
FIG. 1 is a block diagram showing an example of a packet communication network including a packet transfer apparatus to which the first embodiment of the present invention is applied.

FIG. 1 is a block diagram showing an example of a packet communication network including a packet transfer apparatus to which the first embodiment of the present invention is applied.

An outline of this packet communication network will be explained below.

A packet transfer apparatus 10 is connected to packet communication networks 40 and 50, respectively, via interfaces 60 and 70.

A transmission node 20 is connected to the packet communication network 40 via an interface 80. A reception node 30 is connected to the packet communication network 50 via an interface 90. The transmission node 20 outputs a data packet 100 to the reception node 30. The packet transfer apparatus 10 receives this data packet 100 from the interface 60.

The packet transfer apparatus 10 performs a routing process for the input data packet 100 on the basis of header information of the packet. After rewriting the packet's header information as needed, the packet transfer apparatus 10 outputs a data packet 101 from the interface 70. When receiving this data packet 101, the reception node 30 returns an acknowledgement (ACK) packet 200 to the transmission node 20.

This acknowledgement packet 200 is relayed by the packet transfer apparatus 10, and the transmission node 10 receives an acknowledgement packet 201.

Figure 2:
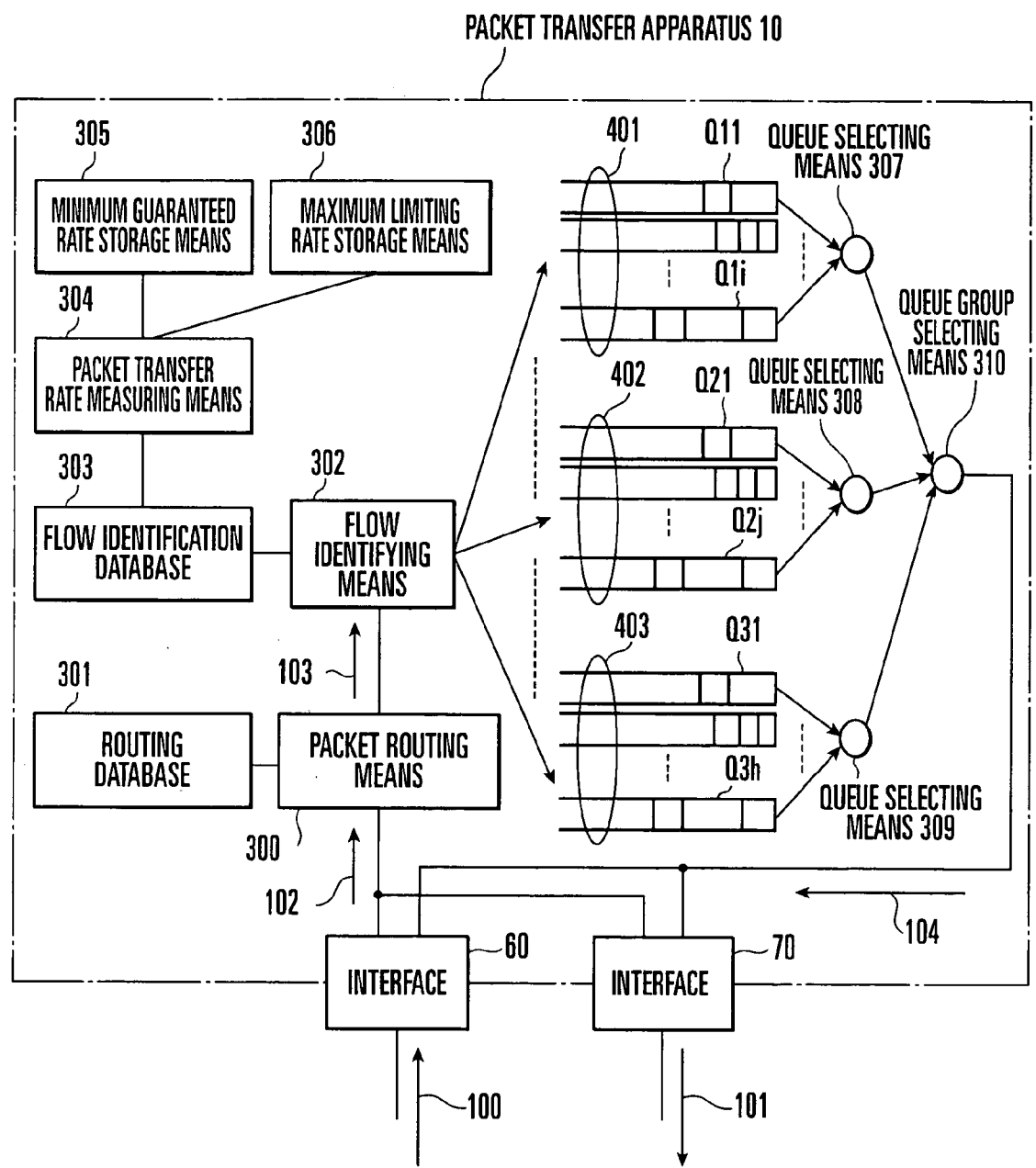
FIG. 2 is a block diagram showing details of the arrangement of the packet transfer apparatus according to the first embodiment of the present invention.

FIG. 2 is a block diagram showing details of the arrangement of the packet transfer apparatus 10 according to the first embodiment of the present invention.

This packet transfer apparatus 10 includes the interfaces 60 and 70, a packet routing means 300, routing database 301, a flow identifying means 302, a flow identification database 303, a packet transfer rate measuring means 304, a minimum guaranteed rate storage means 305, a maximum limiting rate storage means 306, queue selecting means 307, 308, and 309, and a queue group selecting means 310.

When receiving the data packet 100 from the interface 60, the packet transfer apparatus 10 outputs this data packet 100 to the packet routing means 300.

On the basis of header information of an input data packet 102, the packet routing means 300 searches the routing database 301 to determine the output interface 70. In addition, the packet routing means 300 rewrites the header information of the data packet where necessary, and outputs the packet to the flow identifying means 302.

On the basis of header information of a data packet 103, the flow identifying means 302 searches the flow identification database 303 to identify an upper layer's flow corresponding to the received data packet.

The packet transfer rate measuring means 304 stores the measurement value of a packet transfer rate measured for each identified flow, and inquires of the minimum guaranteed rate storage means 305 and maximum limiting rate storage means 306 whether the packet transfer rate is less than the minimum guaranteed rate, equal to or higher than the minimum guaranteed rate and less than the maximum limiting rate, or equal to or higher than the maximum limiting rate.

The flow identifying means 302 inserts (queues) packets, in order of arrival, into queues prepared in one-to-one correspondence with the individual identified flows.

These queues prepared for the individual flows are classified into a queue group (group 1) 401 containing queues {Q11, Q12, . . . , Q1i} lower than the minimum guaranteed rate, a queue group (group 2) 402 containing queues {Q21, Q22, . . . , Q2i} equal to or higher than the minimum guaranteed rate and lower than the maximum limiting rate, and a queue group (group 3) 403 containing queues {Q31, Q32, . . . , Q3h} equal to or higher than the maximum limiting rate.

To extract from a queue a packet to be transferred, the queue for extraction is selected from one of these queue groups.

In this case, the queue selecting means 307, 308, and 309 select queues of flows which belong to the queue groups 401, 402, and 403, respectively.

The queue selection method in these queue selecting means 307, 308, and 309 may be simple round robin scheduling or a method by which expected transfer times are managed on the basis of the minimum guaranteed rate, maximum limiting rate, and packet transfer rate measurement value of each flow, and a packet is extracted from the queue of a flow having the minimum expected transfer time.

The queue group selecting means 310 selects one of the three queues selected by the queue selecting means 307, 308, and 309.

This queue selection in the queue group selecting means 310 is performed such that a queue selected by the queue selecting means 307 has preference to a queue selected by the queue selecting means 308, and a queue selected by the queue selecting means 308 has preference to a queue selected by the queue selecting means 309.

Accordingly, the queue of each flow whose packet transfer rate is less than the minimum guaranteed rate is preferentially selected before the queue of each flow whose packet transfer rate is equal to or higher than the minimum guaranteed rate and less than the maximum limiting rate.

Also, the queue of each flow whose packet transfer rate is equal to or higher than the minimum guaranteed rate and less than the maximum limiting rate is preferentially selected before a queue whose packet transfer rate is equal to or higher than the maximum limiting rate.

Subsequently, the queue selecting means 310 extracts a data packet 104 from the head of the thus selected queue of each flow, measures the packet transfer rate of each flow, and updates the information stored in the packet transfer rate measuring means 304. The extracted data packet 104 is output from the interface 70.

Note that a queue group to which each flow belongs varies whenever the packet transfer rate is performed. If the packet transfer rate rises after packet transfer is continuously performed for the same flow, the queue of each flow is moved from the queue group 401 to the queue group 402, or from the queue group 402 to the queue group 403. On the other hand, if the packet flow rate lowers because no packet transfer can be performed for the same flow for a while, the queue of each flow is moved from the queue group 402 to the queue group 401, or from the queue group 403 to the queue group 402.

In this embodiment as described above, flows are classified into three groups in accordance with the packet transfer rate. This makes it possible to always preferentially transfer a received packet for a flow which transmits packets at a rate less than the minimum guaranteed rate. Therefore, even when traffic has increased temporarily, transfer at the minimum guaranteed rate can be ensured.

FIG. 3 is a view for explaining the data structures of the flow identification database 303, packet transfer rate measuring means 304, minimum guaranteed rate storage means 305, and maximum limiting rate storage means 306 according to the first embodiment of the present invention.

The flow identification database 303 holds information concerning a packet header, e.g., a transmission source IP address 540, destination IP address 541, transport layer protocol 542, transmission source port number 543, and destination port number 544. This flow identification database 303 performs mapping for a corresponding flow identifier 503.

The packet transfer rate measuring means 304 holds, for each identified flow, information containing a flow identifier 502, a measured packet transfer rate 530, a queue group 531 to which the flow belongs, last transfer time 532, and the number 533 of packets being queued. The packet transfer rate measuring means 304 updates these pieces of information when transferring a packet.

The minimum guaranteed rate storage means 305 and maximum limiting rate storage means 306 hold a minimum guaranteed rate 510 and maximum limiting rate 502 corresponding to flow identifiers 500 and 501, respectively.

The packet transfer operation described above can be controlled by using these data structures.

Other embodiments of the present invention will be described below.

Figure 4:
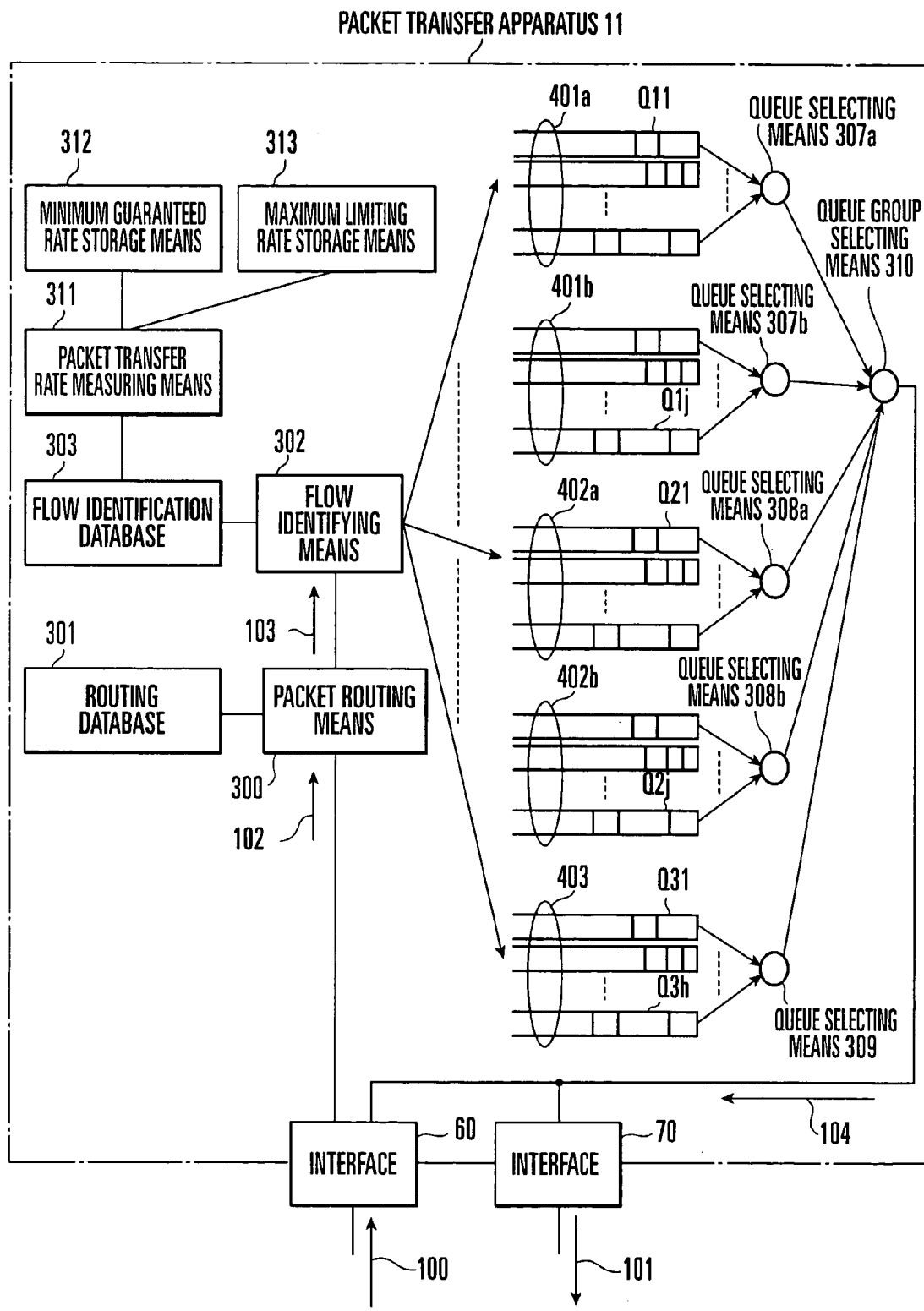
FIG. 4 is a block diagram showing the arrangement of a packet transfer apparatus according to the second and third embodiments of the present invention.

FIG. 4 is a block diagram showing the arrangement of a packet transfer apparatus 11 according to the second embodiment of the present invention.

This packet transfer apparatus 11 includes interfaces 60 and 70, packet routing means 300, routing database 301, flow identifying means 302, flow identification database 303, packet transfer rate measuring means 311, minimum guaranteed rate storage means 312, maximum limiting rate storage means 313, queue selecting means 307a, 307b, 308a, 308b, and 309, and queue group selecting means 310.

In this second embodiment, groups of queues whose packet transfer rates are less than the minimum guaranteed rate are classified into 401a and 401b, and groups of queues whose packet transfer rates are equal to or higher than the minimum guaranteed rate and equal to or lower than the maximum limiting rate are classified into 402a and 402b. This classification is done as follows.

First, the packet transfer rate measuring means 311 holds a sum total Rsum of packet transfer rates $\{R1, R2, \ldots, Ri\}$ measured for flows $\{F1, F2, \ldots, Fi\}$ whose packet transfer rates are less than the minimum guaranteed rate, and a sum total Tsum of packet transfer rates $\{T1, T2, \ldots, Ti\}$ measured for flows $\{G1, G2, \ldots, Gi\}$ whose packet transfer rates are equal to or higher than the minimum guaranteed rate and less than the maximum limiting rate.

The minimum guaranteed rate storage means 312 holds a sum total Ksum of minimum guaranteed rates $\{K1, K2, \ldots, Ki\}$ preset for the flows $\{F1, F2, \ldots, Fi\}$, and a sum total Lsum of minimum guaranteed rates $\{L1, L2, \ldots, Li\}$ preset for the flows $\{G1, G2, \ldots, Gj\}$. The minimum guaranteed rate storage means 312 also calculates weighting coefficients $\{W1, W2, \ldots, Wj\}$ for the flows $\{F1, F2, \ldots, Fi\}$ by W1=K1/Ksum, W2=K2/Ksum, ..., Wj=Kj/Ksum, and weighting coefficients $\{V1, V2, \ldots, Vj\}$ for the flows $\{G1, G2, \ldots, Gj\}$ by V1=L1/Lsum, V2=L2/Lsum, ..., Vj=Lj/Lsum, and holds these weighting coefficients.

Letting C be the interface rate of the packet output interface 70, queues $\{Q11, Q12, \ldots, Q1i\}$ for the flows $\{F1, F2, \ldots, Fi\}$ are classified into the queue group 401a whose packet transfer rate is less than $\{C \times W1, C \times W2, \ldots, C \times Wi\}$, and the queue group 401b whose packet transfer rate is equal to or higher than $\{C \times W1, C \times W2, \ldots, C \times Wi\}$. Queues $\{Q21, Q22, \ldots, Q2j\}$ for the flows $\{G1, G2, \ldots, Gj\}$ are classified into the queue group 402a whose packet transfer rate is less than $\{(C-Ksum) \times V1, (C-Ksum) \times V2, \ldots, (C-Ksum) \times Vj\}$, and the queue group 402b whose packet transfer rate is equal to or higher than $\{(C-Ksum) \times V1, (C-Ksum) \times V2, \ldots, (C-Ksum) \times Vj\}$.

The queue group selecting means 310 preferentially selects queues which belong to the queue group 401a before queues which belong to the queue group 401b, and preferentially selects queues which belong to the queue group 402a before queues which belong to the queue group 402b. When output queues are thus selected, received packets are transferred as follows in accordance with the input traffic amount.

$$\text{Condition } C < (R\text{sum} + T\text{sum}) \quad (1)$$

In this case, a sufficient band is available for all flows which are transferring packets at rates equal to or lower than the maximum limiting rate. Therefore, packets received in relation to flows which belong to the queue groups 401a, 401b, 402a, and 402b are immediately transferred.

$$\text{Condition } R\text{sum} \leq C \leq (R\text{sum} + T\text{sum}) \quad (2)$$

In this case, a sufficient band is available for flows which belong to the queue groups 401a and 401b, so received packets are immediately transferred.

Packets received in relation to flows which belong to the queue group 402a are preferentially transferred before packets received in relation to flows which belong to the queue group 402b.

Note that as in the first embodiment, if the packet transfer rate rises after packet transfer is continuously performed for the same flow, the queue of each flow is moved from the queue group 402a to the queue group 402b and a queue group 403.

On the other hand, if the packet flow rate lowers because no packet transfer can be performed for the same flow for a while, the queue of each flow is moved from the queue group 403 to the queue group 402b, or from the queue group 402b to the queue group 402a.

As described above, packet queues related to flows whose packet transfer rates are equal to or higher than the minimum guaranteed rate and less than the maximum limiting rate are classified into two groups in accordance with the packet transfer rate. This allows an extra band to be fairly distributed in accordance with the minimum guaranteed bands of the individual flows.

Condition C<Rsum   (3)

In this case, no sufficient band can be secured even for flows which belong to the queue groups 401a and 401b. So, the minimum guaranteed rate cannot be assured any longer.

When the total of minimum guaranteed bands reserved for the individual flows is permitted to exceed the line rate, the above situation occurs if the input traffic amount increases temporarily.

Packets received in relation to flows which belong to the queue group 401a are preferentially transferred before packets received in relation to flows which belong to the queue group 401b. Accordingly, the whole band (C) of the output line can be fairly distributed to flows whose packet transfer rates are less than the minimum guaranteed rate, in accordance with the minimum guaranteed band of each flow.

In the second embodiment of the present invention as described above, an extra band can be redistributed to individual flows on the basis of the contracted value of the minimum guaranteed rate of each flow.

This embodiment is suited to a case in which the cost of service which a carrier provides to a subscriber corresponds to the minimum guaranteed rate.

The third embodiment of the present invention will be explained below.

The arrangement of a packet transfer apparatus according to this third embodiment is the same as the packet transfer apparatus 11 of the second embodiment described above.

A maximum limiting rate storage means 313 according to this third embodiment holds a total sum Msum of maximum limiting rates {M1, M2, . . . , Mi} preset for flows {F1, F2, . . . , Fi}, and a total sum Nsum of maximum flow rates {N1, N2, . . . , Ni} preset for flows {G1, G2, . . . , Gj}. This maximum limiting rate storage means 313 also calculates weighting coefficients {W1, W2, . . . , Wj} for the flows {F1, F2, . . . , Fi} by W1=M1/Msum, W2=M2/Msum, . . . , Wj=Mj/Msum, and weighting coefficients {V1, V2, . . . , Vj} for the flows {G1, G2, . . . , Gj} by V1=N1/Nsum, V2=N2/Nsum, . . . , Vj=Nj/Nsum, and holds these weighting coefficients.

Queues {Q11, Q12, . . . , Q1i} are classified into queue groups 401a and 401b on the basis of the weighting coefficients {W1, W2, . . . , Wi} determined on the basis of the maximum limiting rates as described above. Queues {Q21, Q22, . . . , Q2j} are classified into queue groups 402a and 402b on the basis of the weighting coefficients {V1, V2, . . . , Vj} determined on the basis of the maximum limiting rates as described above.

As in the second embodiment, a queue group selecting means 310 preferentially selects queues which belong to the queue group 401a before queues which belong to the queue group 401b, and preferentially selects queues which belong to the queue group 402a before queues which belong to the queue group 402b.

By selecting output queues in this way, an extra band can be redistributed to individual flows on the basis of the contracted value of the maximum limiting rate of each flow.

This embodiment is suited to a case in which the cost of service which a carrier provides to a subscriber corresponds to the maximum limiting rate.

Note that in the second and third embodiments of the present invention, the method of calculating the weighting coefficients {W1, W2, . . . , Wi} and {V1, V2, . . . , Vj} used in the distribution of an extra band is not restricted to the above-mentioned method.

For example, when a carrier wants to decide the extra band distribution plan on the basis of both the contracted values of the minimum guaranteed rate and maximum limiting rate of service, it is possible to externally supply a parameter α within the range of 0 to 1 to the packet transfer apparatus, and calculate $W1=\alpha \times K1/Ksum+(1-\alpha)\times M1/Msum, W2=\alpha \times K2/Ksum+(1-\alpha)\times M2/Msum, \ldots, Wi=\alpha \times Ki/Ksum+(1-\alpha)\times Mi/Msum$, and $V1=\alpha \times L1/Lsum+(1-\alpha)\times N1/Nsum, V2=\alpha \times L2/Lsum+(1-\alpha)\times N2/Nsum, \ldots, Vj=\alpha \times Lj/Lsum+(1-\alpha)\times Nj/Nsum$ by using this parameter α.

The fourth embodiment of the present invention will be explained below.

Figure 5:
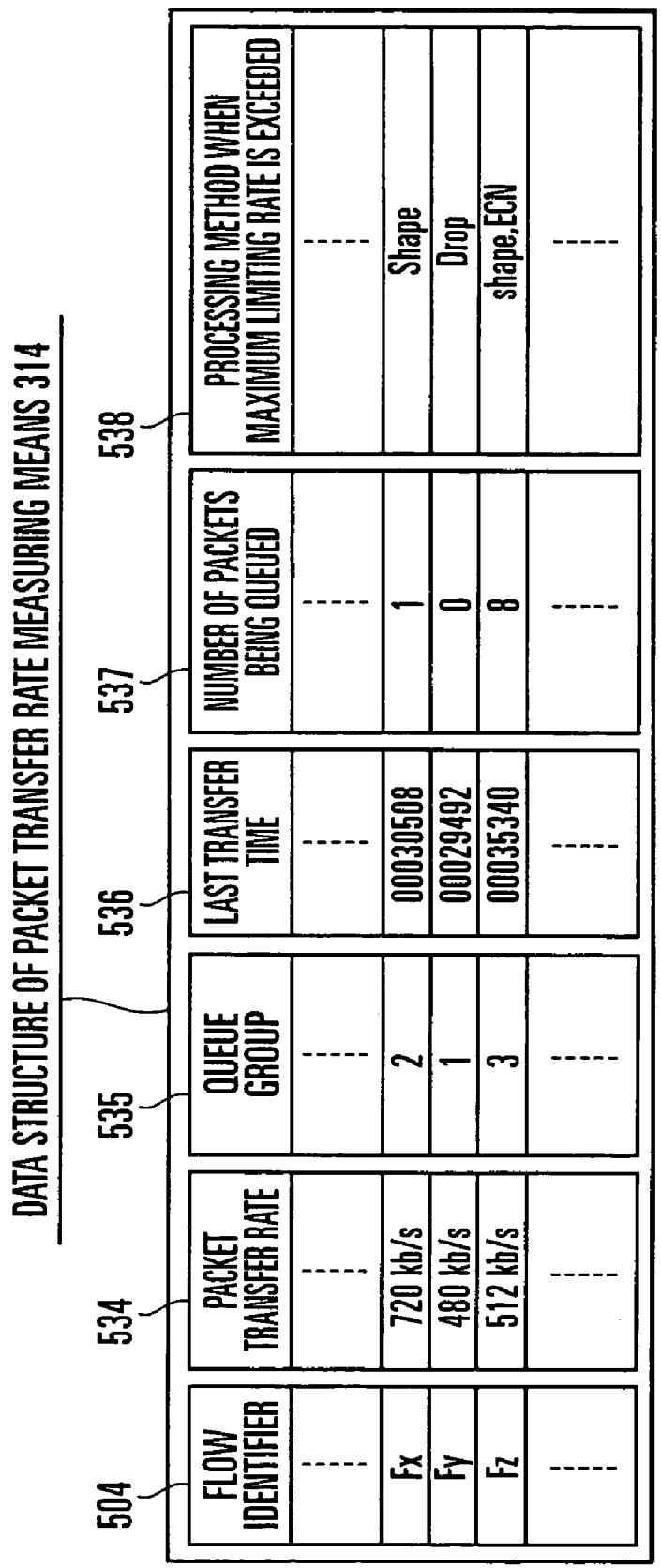
FIG. 5 is a view for explaining the data structure of a packet transfer rate measuring means according to the fourth embodiment of the present invention.

FIG. 5 is a view for explaining the data structure of a packet transfer rate measuring means 314 according to this fourth embodiment.

As in the first embodiment described earlier, a packet transfer rate 534, queue group 535, last transfer time 536, and number 537 of packets being queued are held for each flow. In addition, a processing method 538 when the maximum limiting rate is exceeded is saved for each flow.

Examples of this processing method when the maximum limiting rate is exceeded are traffic shaping (Shape), received packet discarding (Drop), and random packet discarding (Random-Drop).

Furthermore, when a transport layer protocol is TCP, addition of a Congestion experienced bit to the packet header (ECN) and overwriting of 0 to the receiving window size of an acknowledgement packet (Zero-Window) can also be designated in addition to the above processing methods.

This processing method 538 when the maximum limiting rate is exceeded is determined on the basis of a transport layer protocol 542 in flow identification conditions stored in a flow identification database 303.

For example, if the transport layer protocol is UDP, the processing method when the maximum limiting rate is exceeded is set to (Drop). If the transport layer protocol is TCP, the processing method is set to Shape, (Shape, ECN), or Random-Drop.

If the transport layer protocol is TCP and the Congestion experienced bit is added when the maximum limiting rate is exceeded, a reception node notifies a transmission node of the occurrence of congestion in the packet transfer path by using an acknowledgement packet which is returned to the transmission node. Accordingly, the transmission node automatically reduces the transmission rate until the rate becomes equal to or lower than the maximum limiting rate.

Also, if the transport layer protocol is TCP and the receiving window size in the acknowledgement packet returned from the reception node when the maximum limiting rate is exceeded is overwritten to 0, the transmission node temporarily stops packet transmission after that.

After that, the transmission node activates a Persist timer of TCP and periodically probes the receiving window size of the reception node until this receiving widow size becomes large enough.

If the packet transfer rate becomes lower than the maximum limiting rate, the packet transfer apparatus stops overwriting of the receiving window size in the acknowledgement packet. As a consequence, the packet transfer rate can be restricted to the maximum limiting rate. By thus selecting, on the basis of the transport layer protocol of the flow identification conditions, the processing method when the maximum limiting rate is exceeded, it is possible to reduce buffers necessary for shaping and also reduce the processing load required for shaping.

Note that in addition to the packet transfer rate monitoring control apparatus contained in the packet transfer apparatuses having the arrangements as described above, the present invention includes a packet transfer rate monitoring control method comprising the individual procedures described above, and a program for allowing a computer such as a CPU for controlling the packet transfer apparatus to execute these procedures.

As has been explained above, the following effects are obtained by the present invention.

That is, according to the first invention described above, in a packet communication network in which the minimum guaranteed rate and maximum limiting rate of packet transfer are contracted for each service which a subscriber uses, a packet transfer rate equal to or higher than the minimum guaranteed rate can be ensured even when traffic has increased.

According to the second invention described above, flows are classified into three groups in accordance with the packet transfer rate, so packet transfer for a flow lower than the minimum guaranteed rate can always be preferentially performed. Therefore, the minimum guaranteed rates of all flows can be assured even when traffic has increased temporarily. Note that groups to which flows belong are not fixed but vary with time in accordance with the packet transfer rate.

Accordingly, when received packet transfer for a flow which belongs to group 2 is not performed for a while because received packets for a flow which belongs to group 1 are preferentially transferred, the packet transfer rate of the flow which belongs to group 2 lowers. If this packet transfer rate becomes lower than the minimum guaranteed rate, the flow switches to group 1. In this manner, packet transfer equal to or higher than the contracted value of the minimum guaranteed rate can be performed even for a flow which has temporarily exceeded the minimum guaranteed rate.

By queuing packets for each flow as in the third invention described above, shaping can be easily performed, such that the traffic characteristic follows the maximum limiting rate, in addition to packet discarding and tagging, for packets which belong to a flow exceeding the maximum limiting rate.

By redistributing an extra band as in the fourth invention described above, the extra band can be fairly allocated, in accordance with the minimum guaranteed rate of each flow, even to flows whose packet transfer rates are equal to or higher than the minimum guaranteed rate and less than the maximum limiting rate. That is, the extra band can be redistributed to individual flows on the basis of the contracted values of the minimum guaranteed rates. This fourth invention is suited to a case in which the cost of service which a carrier provides to a subscriber corresponds to the minimum guaranteed rate.

According to the fifth invention described above, the weighting coefficients $\{W1, W2, \ldots, Wj\}$ for the flows $\{F1, F2, \ldots, Fi\}$ which belong to group 1 and the weighting coefficients $\{V1, V2, \ldots, Vj\}$ for the flows $\{G1, G2, \ldots, Gj\}$ which belong to group 2 are determined on the basis of not the minimum guaranteed rate of each flow but the maximum limiting rate of each flow as in the fourth invention.

Accordingly, an extra band can be redistributed to the individual flows on the basis of the contracted values of the maximum limiting rates.

This fifth invention is suited to a case in which the cost of service which a carrier provides to a subscriber corresponds to the maximum limiting rate.

According to the sixth invention described above, the weighting coefficients of the aforementioned fourth and fifth inventions are defined by using the parameter $\alpha$ which takes a value from 0 to 1. This allows a carrier to redistribute an extra band on the basis of both the contracted value of the minimum guaranteed rate and the contracted value of the maximum limiting rate.

According to the seventh invention described above, packet discarding and shaping are switched in accordance with a transport layer protocol. Therefore, not only the maximum limiting rate can be accurately restricted, but also shaping buffers can be saved. This solves the following problem.

For example, if packets of a flow exceeding the maximum limiting rate are continuously discarded when the protocol type of the transport layer is TCP, as described in W. Richard Stevens, "TCP/IP Illustrated vol. 1" (Addison-Wesley), Chapter 20, Paragraph 6, slow start by which the transfer rate is gradually raised is performed after the end system restarts packet transmission. This sometimes poses the problem that the actual packet transfer rate is always much lower than the maximum limiting rate. This problem can be avoided by shaping without discarding packets when the maximum limiting rate is exceeded. However, not all transport layer protocols perform this slow start, so shaping buffers are wasted if shaping is always performed.

In the eighth invention described above, as described in RFC2481, when a receiving node receives a packet whose header information has a CE bit added to it, an ECN-echo flag is set in header information of an acknowledgement (ACK) packet to be returned to a transmitting node, and this packet is transmitted to the transmitting node. The transmitting node can lower the transmission rate by receiving this packet in which the ECN-echo flag is set in the header information. Therefore, the packet transfer apparatus can restrict the packet transfer rate to the maximum limiting rate without packet discarding or shaping in the above-mentioned seventh invention. To apply this eighth invention, however, both TCPs of the transmission node and reception node must support RFC2481.

In the ninth invention described above, if the receiving window size of an acknowledgement packet of TCP received by a transmitting node is 0, the transmitting node determines that buffers of a receiving node are exhausted, and temporarily stops transmission.

After that, as described in W. Richard Stevens, "TCP/IP Illustrated vol. 1" (Addison-Wesley), Chapter 22, the transmitting node activates a Persist timer of TCP and periodically probes the receiving window size of the receiving node. If the receiving window size becomes large enough, the transmitting node restarts transmission.

If the packet transfer rate becomes lower than the maximum limiting rate, the packet transfer apparatus stops overwriting of the receiving window size in an acknowledgement packet. Consequently, the packet transfer rate can be restricted to the maximum limiting rate.

According to the 10th invention described above, in a packet communication network in which the minimum guaranteed rate and maximum limiting rate of packet transfer are contracted for each service which a subscriber uses, a packet transfer rate equal to or higher than the minimum guaranteed rate can be assured even when traffic has increased.

The 11th and 12th inventions described above can achieve the same effects as in the second invention described previously.

The invention claimed is:

1. A packet transfer rate monitoring control apparatus of a packet transfer apparatus for routing a variable length packet, wherein
from a received packet, an upper layer flow to which the received packet belongs is identified, a packet transfer rate is measured from a transfer interval and a length of the received packet, and the measured packet transfer rate is compared with rate information preset for each flow to determine a priority order in which individual received packets are transferred, thereby
preferentially transferring the packet received in relation to a flow whose packet transfer rate is less than a minimum guaranteed rate before the packet received in relation to a flow whose packet transfer rate is not less than the minimum guaranteed rate, and
preferentially transferring the packet received in relation to the flow whose packet transfer rate is less than a maximum limiting rate before the packet received in relation to the flow whose packet transfer rate is not less than the maximum limiting rate, said control apparatus further comprising:
upper layer flow identifying means for identifying, from header information of the received packet, the upper layer flow to which the received packet belongs;
packet transfer rate measuring means for measuring the packet transfer rate from the transfer interval and the length of the received packet, for each flow identified by said upper layer flow identifying means;
comparing means for comparing the packet transfer rate measured by said packet transfer rate measuring means with minimum guaranteed rate information and maximum limiting rate information preset for each flow; and
classifying means for classifying flows corresponding to received packets, on a basis of a result of comparison by said comparing means, into
a group 1 to which a flow whose packet transfer rate is less than the minimum guaranteed rate belongs,
a group 2 to which a flow whose packet transfer rate is not less than the minimum guaranteed rate and less than the maximum limiting rate belongs, and
a group 3 to which a flow whose packet transfer rate exceeds the maximum limiting rate belongs,
wherein the packet received in relation to the flow which belongs to said group 1 is preferentially transferred before the packet received in relation to the flow which belongs to said group 2, and the packet received in relation to the flow which belongs to said group 2 is preferentially transferred before the packet received in relation to the flow which belongs to said group 3 is transferred, letting $\{M1, M2, \ldots, Mi\}$ be maximum limiting rates preset for flows $\{F1, F2, \ldots, Fi\}$ which belong to said group 1, and Msum be the sum total of said maximum limiting rates, weighting coefficients $\{W1, W2, \ldots, Wi\}$ for the flows $\{F1, F2, \ldots, Fi\}$ which belong to said group 1 are defined as $W1 = M1/M\text{sum},$ $W2 = M2/M\text{sum}, \ldots,$ $Wi = Mi/M\text{sum},$ letting $\{N1, N2, \ldots, Nj\}$ be maximum limiting rates preset for flows $\{G1, G2, \ldots, Gj\}$ which belong to said group 2, and Nsum be the sum total of said maximum limiting rates, weighting coefficients $\{V1, V2, \ldots, Vj\}$ for the flows $\{G1, G2, \ldots, Gj\}$ which belong to said group 2 are defined as $V1 = N1/N\text{sum},$ $V2 = N2/N\text{sum}, \ldots,$ $Vj = Nj/N\text{sum},$ letting C be an output interface rate of the received packet, the flows $\{F1, F2, \ldots, Fi\}$ of said group 1 are classified into a group 1A whose packet transfer rate is less than $\{C \times W1, C \times W2, \ldots, C \times Wi\}$, and a group 1B whose packet transfer rate is not less than $\{C \times W1, C \times W2, \ldots, C \times Wi\}$, and
the flows $\{G1, G2, \ldots, Gj\}$ of said group 2 are classified into a group 2A whose packet transfer rate is less than $\{(C-M\text{sum}) \times V1, (C-M\text{sum}) \times V2, \ldots, (C-M\text{sum}) \times Vj\}$, and a group 2B whose packet transfer rate is not less than $\{(C-M\text{sum}) \times V1, (C-M\text{sum}) \times V2, \ldots, (C-M\text{sum}) \times Vj\}$, and
the packet received in relation to the flow which belongs to said group 1A is preferentially transferred before the packet received in relation to the flow which belongs to said group 1B, and the packet received in relation to the flow which belongs to said group 2A is preferentially transferred before the packet received in relation to the flow which belongs to said group 2B.

2. The packet transfer rate monitoring control apparatus according to claim 1, wherein the received packets are queued in an order of arrival for each flow identified by said upper layer flow identifying means.

3. The packet transfer rate monitoring control apparatus according to claim 2, wherein
letting $\{K1, K2, \ldots, Ki\}$ be minimum guaranteed rates preset for flows $\{F1, F2, \ldots, Fi\}$ which belong to said group 1, and Ksum be a sum total of said minimum guaranteed rates, weighting coefficients $\{W1, W2, \ldots, Wi\}$ for the flows $\{F1, F2, \ldots, Fi\}$ which belong to said group 1 are defined as $W1 = K1/K\text{sum},$ $W2 = K2/K\text{sum}, \ldots,$ $Wi = Ki/K\text{sum},$ letting $\{L1, L2, \ldots, Lj\}$ be minimum guaranteed rates preset for flows $\{G1, G2, \ldots, Gj\}$ which belong to said group 2, and Lsum be a sum total of said minimum guaranteed rates, weighting coefficients $\{V1, V2, \ldots, Vj\}$ for the flows $\{G1, G2, \ldots, Gj\}$ which belong to said group 2 are defined as $V1 = L1/L\text{sum}$, $V2 = L2/L\text{sum}, \ldots$, $Vj = Lj/L\text{sum}$, letting C be an output interface rate of the received packet, the flows $\{F1, F2, \ldots, Fi\}$ of said group 1 are classified into a group 1A whose packet transfer rate is less than $\{C \times W1, C \times W2, \ldots, C \times Wi\}$, and a group 1B whose packet transfer rate is not less than $\{C \times W1, C \times W2, \ldots, C \times Wi\}$, and the flows $\{G1, G2, \ldots, Gj\}$ of said group 2 are classified into a group 2A whose packet transfer rate is less than $\{(C-K\text{sum}) \times V1, (C-K\text{sum}) \times V2, \ldots, (C-K\text{sum}) \times Vj\}$, and a group 2B whose packet transfer rate is not less than $\{(C-K\text{sum}) \times V1, (C-K\text{sum}) \times V2, \ldots, (C-K\text{sum}) \times Vj\}$, and the packet received in relation to the flow which belongs to said group 1A is preferentially transferred before the packet received in relation to the flow which belongs to said group 1B, and the packet received in relation to the flow which belongs to said group 2A is preferentially transferred before the packet received in relation to the flow which belongs to said group 2B.

4. The packet transfer rate monitoring control apparatus according to claim 2, wherein letting $\{M1, M2, \ldots, Mi\}$ be maximum limiting rates preset for flows $\{F1, F2, \ldots, Fi\}$ which belong to said group 1, and M sum be a sum total of said maximum limiting rates, weighting coefficients $\{W1, W2, \ldots, Wi\}$ for the flows $\{F1, F2, \ldots, Fi\}$ which belong to said group 1 are defined as $W1 = M1/M\text{sum}$, $W2 = M2/M\text{sum}, \ldots$, $Wi = Mi/M\text{sum}$, letting $\{N1, N2, \ldots, Nj\}$ be maximum limiting rates preset for flows $\{G1, G2, \ldots, Gj\}$ which belong to said group 2 and N sum be a sum total of said maximum limiting rates, weighting coefficients $\{V1, V2, \ldots, Vj\}$ for the flows $\{G1, G2, \ldots, Gj\}$ which belong to said group 2 are defined as $V1 = N1/N\text{sum}$, $V2 = N2/N\text{sum}, \ldots$, $Vj = Nj/N\text{sum}$, letting C be an output interface rate of the received packet, the flows $\{F1, F2, \ldots, Fi\}$ of said group 1 are classified into a group 1A whose packet transfer rate is less than $\{C \times W1, C \times W2, \ldots, C \times Wi\}$, and a group 1B whose packet transfer rate is not less than $\{C \times W1, C \times W2, \ldots, C \times Wi\}$, and the flows $\{G1, G2, \ldots, Gj\}$ of said group 2 are classified into a group 2A whose packet transfer rate is less than $\{(C-M\text{sum}) \times V1, (C-M\text{sum}) \times V2, \ldots, (C \times M\text{sum}) \times Vj\}$, and a group 2B whose packet transfer rate is not less than $\{(C-M\text{sum}) \times V1, (C-M\text{sum}) \times V2, \ldots, (C-M\text{sum}) \times Vj\}$, and the packet received in relation to the flow which belongs to said group 1A is preferentially transferred before the packet received in relation to the flow which belongs to said group 1B, and the packet received in relation to the flow which belongs to said group 2A is preferentially transferred before the packet received in relation to the flow which belongs to said group 2B.

5. The packet transfer rate monitoring control apparatus according to claim 2, wherein letting $\{K1, K2, \ldots, Ki\}$ be minimum guaranteed rates preset for flows $\{F1, F2, \ldots, Fi\}$ which belong to said group 1, and K sum be a sum total of these minimum guaranteed rates, weighting coefficients $\{W1, W2, \ldots, Wi\}$ for the flows $\{F1, F2, \ldots, Fi\}$ which belong to said group 1 are defined as $W1 = K1/K\text{sum}$, $W2 = K2/K\text{sum}, \ldots$, $Wi = Ki/K\text{sum}$, letting $\{L1, L2, \ldots, Lj\}$ be minimum guaranteed rates preset for flows $\{G1, G2, \ldots, Gj\}$ which belong to said group 2 and L sum be a sum total of these minimum guaranteed rates, weighting coefficients $\{V1, V2, \ldots, Vj\}$ for the flows $\{G1, G2, \ldots, Gj\}$ which belong to said group 2 are defined as $V1 = L1/L\text{sum}$, $V2 = L2/L\text{sum}, \ldots$, $Vj = Lj/L\text{sum}$, letting $\{M1, M2, \ldots, Mi\}$ be maximum limiting rates preset for the flows $\{F1, F2, \ldots, Fi\}$ which belong to said group 1, and M sum be a sum total of said maximum limiting rates, weighting coefficients $\{W1, W2, \ldots, Wi\}$ for the flows $\{F1, F2, \ldots, Fi\}$ which belong to said group 1 are defined as $W1 = M1/M\text{sum}$, $W2 = M2/M\text{sum}, \ldots$, $Wi = Mi/M\text{sum}$, letting $\{N1, N2, \ldots, Nj\}$ be maximum limiting rates preset for the flows $\{G1, G2, \ldots, Gj\}$ which belong to said group 2, and N sum be a sum total of said maximum limiting rates, weighting coefficients $\{V1, V2, \ldots, Vj\}$ for the flows $\{G1, G2, \ldots, Gj\}$ which belong to said group 2 are defined as $V1 = N1/N\text{sum}$, $V2 = N2/N\text{sum}, \ldots$, $Vj = Nj/N\text{sum}$, by using a parameter a which takes a value from 0 to 1, the weighting coefficients $\{W1, W2, \ldots, Wi\}$ for the flows $\{F1, F2, \ldots, Fi\}$ which belong to said group 1 are defined by $W1 = \alpha \times K1/K\text{sum} + (1-\alpha) \times M1/M\text{sum}$, $W2 = \alpha \times K2/K\text{sum} + (1-\alpha) \times M2/M\text{sum}, \ldots$, $Wi = \alpha \times Ki/K\text{sum} + (1-\alpha) \times Mi/M\text{sum}$, and the weighting coefficients $\{V1, V2, \ldots, Vj\}$ for the flows $\{G1, G2, \ldots, Gj\}$ which belong to said group 2 are defined by $V1=\alpha \times L1/Lsum+(1-\alpha)\times N1/Nsum,$ $V2=\alpha \times L2/Lsum+(1-\alpha)\times N2/Nsum, \ldots,$ $Vj=\alpha \times Lj/Lsum+(1-\alpha)\times Nj/Nsum,$ and the parameter $\alpha$ can be externally set.

6. The packet transfer rate monitoring control apparatus according to claim 2, further comprising:
protocol type identifying means for identifying the protocol type of a transport layer from said header information of the received packet, wherein if the packet transfer rate exceeds the maximum limiting rate, it is selected, in accordance with the transport layer's protocol identified by said protocol type identifying means, to one of discard the received packet and perform shaping by delaying transfer of the received packet until the packet transfer rate becomes not more than the maximum limiting rate.

7. The packet transfer rate monitoring control apparatus according to claim 2, further comprising:
protocol type identifying means for identifying the protocol type of a transport layer from said header information of the received packet, wherein if the transport layer's protocol identified by said protocol type identifying means is Transmission Control Protocol (TCP), and the packet transfer rate exceeds the maximum limiting rate, a Congestion Experienced (CE) bit defined by RFC2481 is added to the header of the received packet to be transferred, thereby informing a transmitting node of suppression of the transmission rate.

8. The packet transfer rate monitoring control apparatus according to claim 2, further comprising:
protocol type identifying means for identifying the protocol type of a transport layer from said header information of the received packet, wherein if the transport layer's protocol identified by said protocol type identifying means is Transmission Control Protocol (TCP), and the packet transfer rate exceeds the maximum limiting rate, a receiving window size is overwritten to 0 in a TCP header of an acknowledgment packet transferred from a receiving node to a transmitting node thereafter, thereby informing the transmitting node of suppression of the transmission rate.

9. The packet transfer rate monitoring control apparatus according to claim 1, wherein
letting $\{K1, K2, \ldots, Ki\}$ be minimum guaranteed rates preset for flows $\{F1, F2, \ldots, Fi\}$ which belong to said group 1, and Ksum be a sum total of said minimum guaranteed rates, weighting coefficients $\{W1, W2, \ldots, Wi\}$ for the flows $\{F1, F2, \ldots, Fi\}$ which belong to said group 1 are defined as $W1=K1/Ksum,$ $W2=K2/Ksum, \ldots,$ $Wi=Ki/Ksum,$ letting $\{L1, L2, \ldots, Lj\}$ be minimum guaranteed rates preset for flows $\{G1, G2, \ldots, Gj\}$ which belong to said group 2, and Lsum be a sum total of said minimum guaranteed rates, weighting coefficients $\{V1, V2, \ldots, Vj\}$ for the flows $\{G1, G2, \ldots, Gj\}$ which belong to said group 2 are defined as $V1=L1/Lsum,$ $V2=L2/Lsum, \ldots,$ $Vj=Lj/Lsum,$ letting C be an output interface rate of the received packet, the flows $\{F1, F2, \ldots, Fi\}$ of said group 1 are classified into a group 1A whose packet transfer rate is less than $\{C \times W1, C \times W2, \ldots, C \times Wi\}$, and a group 1B whose packet transfer rate is not less than $\{C \times W1, C \times W2, \ldots, C \times Wi\}$, and the flows $\{G1, G2, \ldots, Gj\}$ of said group 2 are classified into a group 2A whose packet transfer rate is less than $\{(C-Ksum) \times V1, (C-Ksum) \times V2, \ldots, (C-Ksum) \times Vj\}$, and a group 2B whose packet transfer rate is not less than $\{(C-Ksum) \times V1, (C-Ksum) \times V2, \ldots, (C-Ksum) \times Vj\}$, and said packet received in relation to said flow which belongs to said group 1A is preferentially transferred before said packet received in relation to said flow which belongs to said group 1B, and said packet received in relation to said flow which belongs to said group 2A is preferentially transferred before said packet received in relation to said flow which belongs to said group 2B.

10. The packet transfer rate monitoring control apparatus according to claim 1, wherein
letting $\{K1, K2, \ldots, Ki\}$ be minimum guaranteed rates preset for flows $\{F1, F2, \ldots, Fi\}$ which belong to said group 1, and Ksum be a sum total of said minimum guaranteed rates, weighting coefficients $\{W1, W2, \ldots, Wi\}$ for the flows $\{F1, F2, \ldots, Fi\}$ which belong to said group 1 are defined as $W1=K1/Ksum,$ $W2=K2/Ksum, \ldots,$ $Wi=Ki/Ksum,$ letting $\{L1, L2, \ldots, Lj\}$ be minimum guaranteed rates preset for flows $\{G1, G2, \ldots, Gj\}$ which belong to said group 2, and Lsum be a sum total of these minimum guaranteed rates,
weighting coefficients $\{V1, V2, \ldots, Vj\}$ for the flows $\{G1, G2, \ldots, Gj\}$ which belong to said group 2 are defined as $V1=L1/Lsum,$ $V2=L2/Lsum, \ldots,$ $Vj=Lj/Lsum,$ letting $\{M1, M2, \ldots, Mi\}$ be maximum limiting rates preset for the flows $\{F1, F2, \ldots, Fi\}$ which belong to said group 1, and Msum be a sum total of said maximum limiting rates, weighting coefficients $\{W1, W2, \ldots, Wi\}$ for the flows $\{F1, F2, \ldots, Fi\}$ which belong to said group 1 are defined as $W1=M1/Msum,$ $W2=M2/Msum, \ldots,$ $Wi=Mi/Msum,$ letting $\{N1, N2, \ldots, Nj\}$ be maximum limiting rates preset for the flows $\{G1, G2, \ldots, Gj\}$ which belong to said group 2, and Nsum be a sum total of said maximum limiting rates,
weighting coefficients $\{V1, V2, \ldots, Vj\}$ for the flows $\{G1, G2, \ldots, Gj\}$ which belong to said group 2 are defined as $V1=N1/N\text{sum},$ $V2=N2/N\text{sum}, \ldots,$ $Vj=Nj/N\text{sum},$ by using a parameter $\alpha$ which takes a value from 0 to 1, the weighting coefficients $\{W1, W2, \ldots, Wi\}$ for the flows $\{F1, F2, \ldots, Fi\}$ which belong to said group 1 are defined by $W1=\alpha \times K1/K\text{sum}+(1-\alpha)\times M1/M\text{sum},$ $W2=\alpha \times K2/K\text{sum}+(1-\alpha)\times M2/M\text{sum}, \ldots,$ $Wi=\alpha \times Ki/K\text{sum}+(1-\alpha)\times Mi/M\text{sum},$ and the weighting coefficients $\{V1, V2, \ldots, Vj\}$ for the flows $\{G1, G2, \ldots, Gj\}$ which belong to said group 2 are defined by $V1=\alpha \times L1/L\text{sum}+(1-\alpha)\times Nj/N\text{sum},$ $V2=\alpha \times L2/L\text{sum}+(1-\alpha)\times N2/N\text{sum}, \ldots,$ $Vj=\alpha \times Lj/L\text{sum}+(1-\alpha)\times Nj/N\text{sum},$ and the parameter $\alpha$ can be externally set.

11. The packet transfer rate monitoring control apparatus according to claim 1, further comprising:
protocol type identifying means for identifying a protocol type of a transport layer from said header information of the received packet,
wherein if the packet transfer rate exceeds the maximum limiting rate, it is selected, in accordance with the transport layer's protocol identified by said protocol type identifying means, to one of discard the received packet and perform shaping by delaying transfer of the received packet until the packet transfer rate becomes not more than the maximum limiting rate.

12. The packet transfer rate monitoring control apparatus according to claim 1, further comprising:
protocol type identifying means for identifying a protocol type of a transport layer from said header information of the received packet, wherein if the transport layer's protocol identified by said protocol type identifying means is Transmission Control Protocol (TCP) and the packet transfer rate exceeds the maximum limiting rate, a Congestion Experienced (CE) bit defined by RFC2481 is added to the header of the received packet to be transferred, thereby informing a transmitting node of suppression of the transmission rate.

13. The packet transfer rate monitoring control apparatus according to claim 1, further comprising:
protocol type identifying means for identifying a protocol type of a transport layer from said header information of the received packet, wherein if the transport layer's protocol identified by said protocol type identifying means is Transmission Control Protocol (TCP), and said packet transfer rate exceeds the maximum limiting rate, a receiving window size is overwritten to 0 in a TCP header of an acknowledgment packet transferred from a receiving node to a transmitting node thereafter, thereby informing the transmitting node of suppression of the transmission rate.

14. A packet transfer rate monitoring control method of a packet transfer apparatus for routing a variable length packet, wherein
from a received packet, an upper layer flow to which the received packet belongs is identified, a packet transfer rate is measured from a transfer interval and a length of the received packet, and the measured packet transfer rate is compared with rate information preset for each flow to determine a priority order in which individual received packets are transferred,
thereby preferentially transferring the packet received in relation to a flow whose packet transfer rate is less than a minimum guaranteed rate before the packet received in relation to a flow whose packet transfer rate is not less than the minimum guaranteed rate, and
preferentially transferring the packet received in relation to a flow whose packet transfer rate is less than a maximum limiting rate before the packet received in relation to a flow whose packet transfer rate is not less than the maximum limiting rate,
wherein a packet transfer operation is performed to transfer a packet, rather than dropping the packet, when a transfer rate of said packet exceeds the maximum limiting rate, said packet transfer operation comprising delaying transfer of the packet until the transfer rate of said packet becomes equal to or lower than the maximum limiting rate, and
wherein, when a transport layer protocol is transmission control protocol (TCP) and a congestion experienced bit is added to a package header when the maximum limiting rate is exceeded, a reception node notifies a transmission node of an occurrence of congestion in a packet transfer path by using an acknowledgement packet which is returned to the transmission node.

15. A packet transfer rate monitoring control method, comprising:
an upper layer flow identification procedure of identifying, from header information of a received packet, an upper layer flow to which the received packet belongs;
a packet transfer rate measurement procedure of measuring a packet transfer rate from a transfer interval and a length of the received packet, for each flow identified by the upper layer flow identification procedure;
a comparison procedure of comparing the packet transfer rate measured by the packet transfer rate measurement procedure with minimum guaranteed rate information and maximum limiting rate information preset for each flow;
a classification procedure of classifying flows corresponding to received packets, on a basis of a result of comparison by the comparison procedure, into
a group 1 to which a flow whose packet transfer rate is less than the minimum guaranteed rate belongs,
a group 2 to which a flow whose packet transfer rate is not less than the minimum guaranteed rate and less than the maximum limiting rate belongs, and
a group 3 to which a flow whose packet transfer rate exceeds the maximum limiting rate belongs; and
a transfer control procedure of preferentially transferring the packet received in relation to the flow which belongs to said group 1 before the packet received in relation to the flow which belongs to said group 2, and preferentially transferring the packet received in relation to the flow which belongs to said group 2 before the packet received in relation to the flow which belongs to said group 3,
wherein a packet transfer operation is performed to transfer a packet, rather than dropping the packet, when a transfer rate of said packet exceeds the maximum limiting rate, said packet transfer operation comprising delaying transfer of the packet until the transfer rate of said packet becomes equal to or lower than the maximum limiting rate, and wherein, when a transport layer protocol is transmission control protocol (TCP) and a congestion experienced bit is added to a package header when the maximum limiting rate is exceeded, a reception node notifies a transmission node of an occurrence of congestion in a packet transfer path by using an acknowledgement packet which is returned to the transmission node.

16. A tangible computer-readable storage medium storing encoded with a computer program for controlling an operation of a computer which controls a packet transfer apparatus for routing a variable length packet, characterized by allowing said computer to execute:

an upper layer flow identification procedure of identifying, from header information of a received packet, an upper layer flow to which the received packet belongs;

a packet transfer rate measurement procedure of measuring a packet transfer rate from a transfer interval and a length of the received packet, for each flow identified by the upper layer flow identification procedure;

a comparison procedure of comparing the packet transfer rate measured by the packet transfer rate measurement procedure with minimum guaranteed rate information and maximum limiting rate information preset for each flow;

a classification procedure of classifying flows corresponding to received packets, on a basis of a result of comparison by the comparison procedure, into a group 1 to which a flow whose packet transfer rate is less than the minimum guaranteed rate belongs, a group 2 to which a flow whose packet transfer rate is not less than the minimum guaranteed rate and less than the maximum limiting rate belongs, and a group 3 to which a flow whose packet transfer rate exceeds the maximum limiting rate belongs; and a transfer control procedure of preferentially transferring the packet received in relation to the flow which belongs to said group 1 before the packet received in relation to the flow which belongs to said group 2, and preferentially transferring the packet received in relation to the flow which belongs to said group 2 before the packet received in relation to the flow which belongs to said group 3, wherein a packet transfer operation is performed to transfer a packet, rather than dropping the packet, when transfer rate of said packet exceeds the maximum limiting rate, said packet transfer operation comprising delaying transfer of the packet until the transfer rate of said packet becomes equal to or lower than the maximum limiting rate, and wherein, when a transport layer protocol is transmission control protocol (TCP) and a congestion experienced bit is added to a package header when the maximum limiting rate is exceeded, a reception node notifies a transmission node of an occurrence of congestion in a packet transfer path by using an acknowledgement packet which is returned to the transmission node.

* * * * *